United States Patent

Kiyokawa et al.

[11] Patent Number: 5,874,168
[45] Date of Patent: Feb. 23, 1999

[54] FLUOROCARBON COMPOUND-HYDROGEN STORAGE ALLOY COMPOSITE AND METHOD OF MANUFACTURING THE SAME

[75] Inventors: Hajime Kiyokawa; Masayuki Takashima; Susumu Yonezawa, all of Fukui, Japan

[73] Assignee: Kiyokawa Plating Industries, Co., Ltd., Fukui-ken, Japan

[21] Appl. No.: 691,283

[22] Filed: Aug. 1, 1996

[30] Foreign Application Priority Data

Aug. 3, 1995 [JP] Japan ................................. 7-198780

[51] Int. Cl.$^6$ ................................ B32B 5/16; B22F 3/10; B22F 7/04
[52] U.S. Cl. ....................... 428/407; 428/421; 428/548; 428/550; 428/551; 428/565; 428/570; 428/639; 428/696; 428/697; 428/698; 428/699; 428/704
[58] Field of Search ..................... 428/327, 328, 428/403, 407, 421, 457, 689, 697, 698, 699, 696, 704, 550, 551, 565, 570, 613, 639, 548

[56] References Cited

U.S. PATENT DOCUMENTS

| | | | |
|---|---|---|---|
| 4,110,425 | 8/1978 | Buhl et al. | 423/648 |
| 4,433,063 | 2/1984 | Bernstein et al. | 502/402 |
| 4,737,249 | 4/1988 | Shepard et al. | 204/129 |
| 5,128,219 | 7/1992 | Kohler et al. | 429/59 |
| 5,387,478 | 2/1995 | Muta et al. | 429/59 |
| 5,639,569 | 6/1997 | Kohler et al. | 429/59 |
| 5,662,729 | 9/1997 | Nishimura et al. | 75/252 |

FOREIGN PATENT DOCUMENTS 04283268 10/1992 Japan .

Primary Examiner—H. Thi Le
Attorney, Agent, or Firm—Panitch Schwarze Jacobs & Nadel, P.C.

[57] ABSTRACT

There is provided a fluorocarbon compound-hydrogen storage alloy composite which has a sufficient water-repellent property and can efficiently absorb a hydrogen gas. The composite comprises hydrogen storage alloy particles which have a plated metal film covering at least a part of the particles, the plated metal film containing at least one fine particle of a fluorocarbon compound. Examples of the metal used for plating include Ni, Cu, Co, Ni-P, Ni-W, Ni-W-P, Ni-B, Ni-W-B, Cu-Ni, Cu-P, Co-P, Co-B, and Co-W. Polytetrafluoroethylene is preferably used for the fluorocarbon compound. The fluorocarbon compound hydrogen storage alloy composite is prepared by electrolytically plating the hydrogen storage alloy particles in a pyrophosphate bath with fine particles of a fluorocarbon compound dispersed therein.

8 Claims, 2 Drawing Sheets

FLUOROCARBON COMPOUND-HYDROGEN STORAGE ALLOY COMPOSITE AND METHOD OF MANUFACTURING THE SAME

BACKGROUND OF THE INVENTION

1. Field of the Invention

The present invention relates to a fluorocarbon compound-hydrogen storage alloy composite prepared by coating the surface of hydrogen storage alloy particles with a plated metal film containing a fine particle or particles of a water-repellent fluorocarbon compound, and a method of manufacturing the same.

2. Description of the Prior Art

With the recent spread of portable communication equipment and cordless equipment, the demand for secondary batteries, such as nickel-cadmium batteries, has drastically increased in order to realize reduction in size and weight of such equipment. From the viewpoints of environmental preservation of the globe and recycle of the resource, collection of used nickel-cadmium batteries becomes a social issue. Nickel-metal hydride batteries using a hydrogen storage alloy as a negative electrode have been noted as clean and high performance secondary batteries with a high energy density.

The negative electrode using a hydrogen storage alloy absorbs and releases hydrogen during the charging and discharging processes. In the charging process, the hydrogen storage alloy absorbs hydrogen while a hydride of the alloy absorbs an oxygen gas generated from the positive electrode. It is thus required that three phase zones comprising the solid phase, the liquid phase, and the gas phase exist in the electrode in a well balanced manner. In actual fact, however, the part in contact with the gas phase decreases, and the efficiency of the gas absorbing reaction is thereby lowered. Especially in the rapid charging process, the internal pressure of the battery abnormally increases and the electrolyte as well as the oxygen gas is released from the battery, which results in deteriorating the discharge capacity and the charge-discharge characteristics of the battery.

Conventionally, repeated charging and discharging operation increases the thickness of oxides or hydroxides formed on the surface of the alloy and enhances the contact resistance of alloy particles, thereby preventing the smooth progress of electrode reaction and deteriorating the performance of the battery.

The hydrogen storage alloy repeats expansion and contraction of volume by approximately 10 to 25%, due to absorption and desorption of hydrogen. The progress of charge-discharge cycle accordingly causes reduction of the particle size of the alloy, which results in undesirable release of fine alloy particles from the electrode.

One proposed countermeasure against the above problem includes mixing a polyfluorocarbon binder with hydrogen storage alloy particles plated with copper, molding the resultant mixture by cold press, and hot pressing the mold together with nickel meshes as a current collector at 300° C. to yield an alloy negative electrode. This technique, however, has difficulty in homogeneously mixing the binder with the alloy particles. The excess amount of the binder undesirably increases the contact resistance of the alloy particles, whereas the insufficient amount results in poor formation of the gas phase, with a failure of attaining the required performance.

Strongly demanded is thus development of a highly reliable hydrogen storage alloy electrode which can be charged rapidly and endures repeated charging and discharging operation.

SUMMARY OF THE INVENTION

The object of the present invention is thus to provide a hydrogen storage alloy composite that gives an improved electrode fulfilling the above requirements.

Another object of the present invention is to provide a fluorocarbon compound hydrogen storage alloy composite which has a sufficient water-repellent property and can efficiently absorb a hydrogen gas.

The present invention provides a fluorocarbon compound-hydrogen storage alloy composite comprising hydrogen storage alloy particles having a plated metal film covering at least a part of the surface of the alloy particles, the plated metal film containing at least one fine particle of a fluorocarbon compound.

It is preferable that the metal used for plating comprises at least one metal selected from the group consisting of Ni, Cu, Co, nickel alloys such as Ni-P, Ni-W, Ni-W-P, Ni-B, Ni-W-B, and Cu-Ni, copper alloys such as Cu-P, and cobalt alloys such as Co-P, Co-B, and Co-W.

It is preferable that the plated metal film is a porous film which does not prevent diffusion of hydrogen.

In a preferred mode of the present invention, the metal film has a thickness of 0.01 to 50 $\mu$m, more preferably 1 to 10 $\mu$m.

A fluorocarbon resin having a water-repellent property can be used as the fluorocarbon compound.

In a preferred mode of the present invention, the fluorocarbon compound is a polyfluorocarbon, such as polytetrafluoroethylene, having a degree of polymerization of 1,000 to 50,000, more specifically 5,000 to 10,000 since such polymer has a high existence ratio of $CF_3$ in the terminal group and an excellent water-repellent property.

In a preferred mode of the present invention, the fluorocarbon compound particles have a diameter of 0.01 to 50 $\mu$m, more preferably 1 to 5 $\mu$m.

The present invention is also directed to a method of manufacturing a fluorocarbon compound-hydrogen storage alloy composite, which comprises electrolytically plating hydrogen storage alloy particles in a pyrophosphate bath having fine particles of a fluorocarbon compound dispersed therein to deposit a copper or a copper alloy film containing a particle or particles of the fluorocarbon compound on the surface of the hydrogen storage alloy particles.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE PREFERRED EMBODIMENTS

Figure 1:
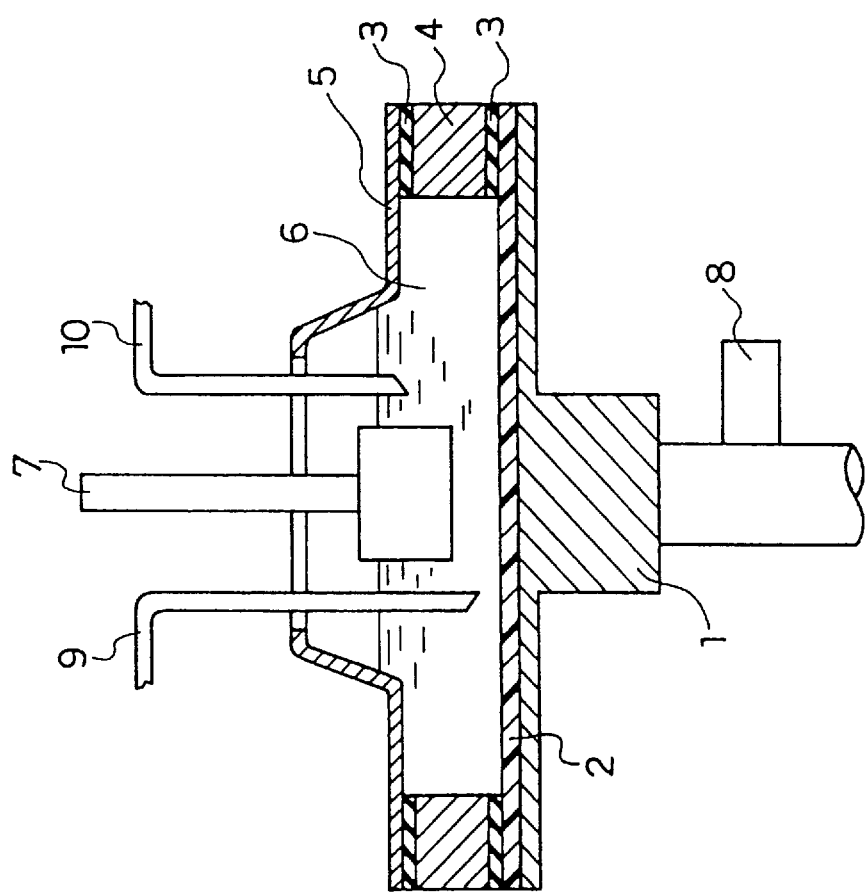
FIG. 1 is a vertical cross-sectional view illustrating the structure of a plating device used in an embodiment of the present invention.

A fluorocarbon compound-hydrogen storage alloy composite of the present invention includes a hydrogen storage alloy whose surface is plated with a metal containing a particle or particles of a fluorocarbon compound, that is, with a composite film of a fluorocarbon compound and a metal.

This structure effectively prevents release of the composite film from the surface of the hydrogen storage alloy even when the alloy is exposed to alternate expansion and contraction during the repeated charging and discharging operation. Formation of a water-repellent surface on the hydrogen storage alloy prevents the whole surface in the vicinity of the surface of the hydrogen storage alloy from being wet with an electrolyte, but allows the surface to be in contact with a gas, thereby improving the gas-absorbing ability of the alloy at the time of overcharging.

Since the fluorocarbon compound included in the composite film acts as a binder, the fluorocarbon compound-hydrogen storage alloy composite of the present invention can constitute an electrode independently or with only a very little amount of another binder. While the conventional hydrogen storage alloy particles have a disadvantage of enhanced contact resistance due to the binder existing between the alloy particles, the fluorocarbon compound-hydrogen storage alloy composite of the present invention is free from such a disadvantage and possesses sufficient conductivity in its composite deposit, thereby enabling the electrode reaction to proceed smoothly.

The surface of the alloy is coated with a metal, such as Cu, Ni, or Co, which improves the thermal conductivity of the alloy and decreases the contact resistance to suppress oxidation of the hydrogen storage alloy.

Examples of an electrolytic plating bath used for plating the surface of the hydrogen storage alloy with a copper or copper alloy film containing a fine particle or fine particles of a fluorocarbon compound include a copper sulfate bath, a copper cyanide bath, and a copper pyrophosphate bath. Among these bathes, the copper pyrophosphate bath gives a film of a wide contact angle and causes a large amount of fluorocarbon compound particles to deposit together. The copper sulfate bath has a very low pH (pH<1), which interferes with the activity of a surfactant and suppresses the dispersion of fluorocarbon compound particles. The copper cyanide bath, on the contrary, has a very high pH (pH>12), which also interferes with the activity of the surfactant and suppresses the dispersion of fluorocarbon compound particles. The copper pyrophosphate bath, however, has a substantially neutral pH (7<pH <9) within the active range of surfactant, thus accelerating the dispersion of fluorocarbon compound particles and increasing the amount of fluorocarbon compound particles depositing together with copper on the surface of the hydrogen storage alloy.

Known alloys listed below may be applicable to the hydrogen storage alloy of the present invention. The alloy particles have a diameter of 0.01 to 2 mm, more preferably 10 to 100 $\mu$m.

(1) $AB_5$-Type (rare earth element-containing) alloys $LaNi_5$, $LaNi_4Cu$, $LaNi_4Al$, $LaNi_{2.5}Co_{2.5}$, $La_{0.8}Nd_{0.2}Ni_2Co_3$, $La_{0.7}Nd_{0.2}Ti_{0.1}Ni_{2.5}CO_{2.4}Al_{0.1}$, $La_{0.8}Nd_{0.2}Ni_{2.5}CO_{2.4}Si_{0.1}$, $La_{0.9}Zr_{0.1}Ni_{4.5}Al_{0.5}$, $MmNi_5$ (Mm=Mischmetal), $MmNi_{3.55}Co_{0.75}Mn_{0.4}Al_{0.3}$, $MmNi_{4.2}Mn_{0.6}Al_{0.2}$, $MmNi_3Co_{1.5}Al_{0.5}$, and $MmB_x$ (x=4.55 to 4.76, B=Ni, Co, Mn, or Al)

(2) $AB/A_2B$-type (titanium-containing) alloys

TiNi, $Ti_2Ni$, $TiMn_{1.5}$, $Ti_2Ni$-TiNi multi-component alloys (wherein Ni is partly substituted by V, Cr, Zr, Mn, Co, Cu, or Fe), and $Ti_{1-y}Zr_yNi_x$ (x=0.5 to 1.45, y=0 to 1)

(3) $AB_2$-type (Laves phase) alloys $Ti_{2-x}Zr_x V_{4-y}Ni_y$, $Ti_{1-x}Cr_xV_{2-y}Ni_y$, $ZrV_{0.4}Ni_{1.6}$, $ZrMn_{0.6}Cr_{0.2}Ni_{1.2}$, $Ti_{17}Zr_{15}V_{22}Ni_{39}Cr_7$, $LaNi_2$, and $CeNi_2$.

The method of plating the surface of the hydrogen storage alloy particles with a composite film of a fluorocarbon compound and a metal will be described below.

The alloy particles are degreased and subsequently activated.

In the degreasing process, the alloy particles are treated with acetone for 3 minutes at 25° C. and then washed with water.

Different activating processes are carried out prior to electrolytic plating and electroless plating.

In accordance with a general procedure of pre-treatment of electrolytic plating, the alloy particles are treated with an acid (5% sulfuric acid for 1 minute at 25° C.). The alloy particles which are not easily plated are first immersed in a standard bath of DP-13 Foundation (Okuno Pharmaceutical Co., Ltd.) for 3 minutes at 45° C. for the purpose of surface adjustment, washed with water, immersed in a bath containing 250 ml/l DP-4E Conductor (Okuno Pharmaceutical Co., Ltd.) and 50 ml/l DP-4E Conductor Mu (Okuno Pharmaceutical Co., Ltd.) for 5 minutes at 45° C. for the purpose of adding a conducting agent, and washed again with water. The alloy particles are then immersed in a standard bath of DP-505 Stabilizer (Okuno Pharmaceutical Co., Ltd.) for 3 minutes at 40° C. for the purpose of forming a conductive film, washed with water, and subsequently immersed in a bath containing 50 ml/l 1 98% sulfuric acid for 1 minute at 25° C. for the purpose of acid activation, and washed again with water.

In accordance with a typical procedure of pre-treatment in the electroless plating process, as in the electrolytic plating process, the alloy particles are treated with an acid (5% sulfuric acid at 25° C. for 1 minute). The alloy particles which are difficult to plate are immersed in a sensitizer solution containing 30 g/l stannous chloride and 15 ml/l hydrochloric acid for 3 minutes at 25° C., washed with water, subsequently immersed in an activator solution containing 0.2 g/l palladium chloride and 4 ml/l hydrochloric acid for 3 minutes at 25° C., and washed again with water. This activating process is repeated twice.

The following describes a general procedure of electrolytic plating.

FIG. 1 schematically illustrates the structure of a barrel plating device used in the following examples.

A substantially disc-shaped cell assembly is prepared by mounting a cell base 2 on a rotary table 1, fixing a ring shaped cathode plate 4 sandwiched between packings 3 onto the cell base 2, and further mounting a cover 5 on the assembly. A plating solution 6 is stored in the cell assembly, and an anode 7 is inserted in the plating solution 6. The cathode 4 is electrically connected with the rotary table 1, which is further connected to a power source via a brush 8.

Pre-treated hydrogen storage alloy particles are placed in the cell assembly, which is then rotated at a high rate (400 rpm). By a rotation-induced centrifugal force, the alloy particles come into close contact with the ring-shaped cathode plate 4 on the circumference of the cell assembly, and is provided with electricity from the cathode plate 4, and then plated. The plating solution is supplied from a plating solution supply nozzle 9. Excess plating solution is fed back to an outer plating solution reservoir via a plating solution exhaust nozzle 10. A cut off value of the output of the plating solution slightly greater than the supplying amount of the plating solution secures a constant reserve of the plating solution in the cell assembly at the height of the lower end of the plating solution exhaust nozzle 10.

Figure 2:
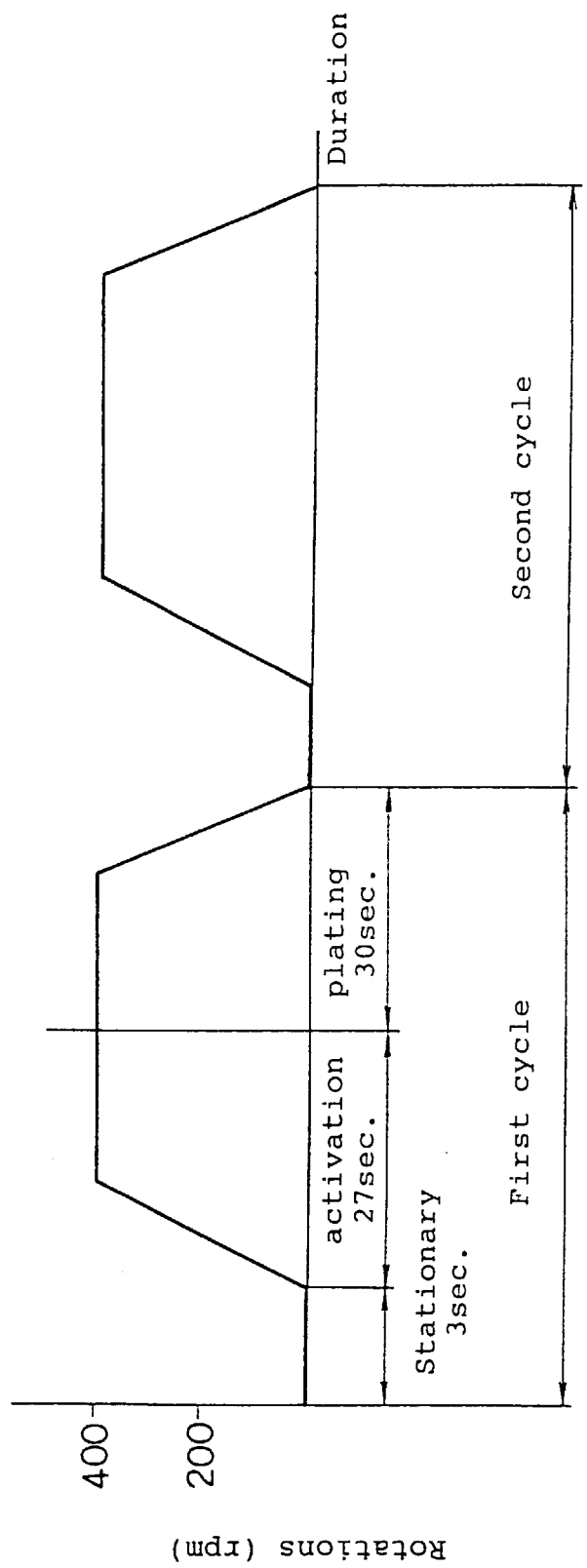
FIG. 2 is a time chart illustrating the operation of the same plating device.

In the process of plating using this plating device, as shown in FIG. 2, the cell assembly is kept stationary for initial 3 seconds, and then a motor for driving the cell assembly is started. Then, the cell assembly is rotated gradually increasing the rate of rotation up to a constant rate of 400 rpm, and the motor is stopped to discontinue the rotation of the cell assembly. During an interval of 30 seconds from the time point of 27 seconds after activation of the motor to the discontinuation of the rotation of the cell assembly, a current flow is passed between an anode 7 and a cathode plate 4 to effect plating. Three seconds after cessation of the rotation, the cell assembly is rotated again in the same direction or in an inverse direction. While the cell assembly is rotated, a current flow is passed between the cathode plate and the anode to effect plating for the latter 30 seconds of the rotation. The plating solution and alloy particles can be mixed and stirred well by repeating this cycle, which gives a substantially homogeneous, smooth plating on the alloy particles. Exhaust of the plating solution is allowed only when substantially all the alloy particles are in close contact with the ring-shaped cathode plate 4 by the centrifugal force induced by the rotation of the cell assembly, in order to prevent outflow of the alloy particles floating on the plating solution at the time of stoppage and acceleration of the rotation of the cell assembly.

The following show the plating bath compositions, plating conditions and the thicknesses of the obtained films when $MmNi_{3.55}Co_{0.75}Mn_{0.4}Al_{0.3}$ particles having a mean diameter of 50 μm are electrolytically plated using the plating device as described above. In the following examples of the electrolytic plating, the plating time represents a time required for the above-mentioned plating cycle, and the duration of electric current flow represents a sum of hours when a current flow was passed to effect plating.

EXAMPLE 1

Electrolytic Nickel Plating (Watt Bath)

| | |
|---|---|
| $NiSO_4.6H_2O$ | 250 (g/l) |
| $NiCl_2.6H_2O$ | 45 (g/l) |
| $H_3BO_3$ | 40 (g/l) |
| Surfactant | 1.0 (g/l) |
| PTFE | 100 (g/l) |
| pH | 4.0 |
| Cathode current density | 10 A/dm$^2$ |
| Temperature | 50° C. |
| Anode | Ni plate |
| Stirring | Circulation |
| Plating time | 30 minutes (duration of electric current flow: 15 minutes) |
| Thickness of plated film | 3 μm |

PTFE used herein was polytetrafluoroethylene having a degree of polymerization of 8,000 to 10,000 and a diameter of 1 to 5 μm.

EXAMPLE 2

Electrolytic Nickel Plating (Sulfamic Acid Bath)

| | |
|---|---|
| $Ni(NH_2SO_3)_2.4H_2O$ | 350 (g/l) |
| $NiCl_2.6H_2O$ | 45 (g/l) |
| $H_3BO_3$ | 40 (g/l) |
| Surfactant | 1.0 (g/l) |
| PTFE | 100 (g/l) |
| pH | 4.0 |
| Cathode current density | 10 A/dm$^2$ |
| Temperature | 50° C. |
| Anode | Ni plate |
| Stirring | Circulation |
| Plating time | 30 minutes (duration of electric current flow: 15 minutes) |
| Thickness of plated film | 3 μm |

EXAMPLE 3

Electrolytic Copper Plating

| | |
|---|---|
| $Cu_2P_2O_7.3H_2O$ | 80 (g/l) |
| $K_4P_2O_7$ | 300 (g/l) |
| Surfactant | 1.0 (g/l) |
| PTFE | 100 (g/l) |
| pH | 8.5 |
| Cathode current density | 4 A/dm$^2$ |
| Temperature | 50° C. |
| Anode | Cu plate |
| Stirring | Circulation |
| Plating time | 75 minutes (duration of electric current flow: 37.5 minutes |
| Thickness of plated film | 3 μm |

EXAMPLE 4

Electrolytic Ni-P Plating

| | |
|---|---|
| $NiSO_4.6H_2O$ | 250 (g/l) |
| $NiCl_2.6H_2O$ | 45 (g/l) |
| $H_3BO_3$ | 40 (g/l) |
| $H_3PO_4$ | 40 (g/l) |
| Surfactant | 1.0 (g/l) |
| PTFE | 100 (g/l) |
| pH | 1.5 |
| Cathode current density | 4 A/dm$^2$ |
| Temperature | 50° C. |
| Anode | Ni plate |
| Stirring | Circulation |
| Plating time | 150 minutes (duration of electric current flow: 75 minutes) |
| Thickness of plated film | 3 μm |

EXAMPLE 5

Electrolytic Co Plating

| | |
|---|---|
| $CoSO_4.7H_2O$ | 250 (g/l) |
| $CoCl_2.6H_2O$ | 45 (g/l) |
| $H_3BO_3$ | 40 (g/l) |
| Surfactant | 1.0 (g/l) |
| PTFE | 100 (g/l) |
| pH | 4.0 |
| Cathode current density | 10 A/dm$^2$ |
| Temperature | 50° C. |
| Anode | Co plate |
| Stirring | Circulation |
| Plating time | 30 minutes (duration of electric current flow: 15 minutes) |
| Thickness of plated film | 3 μm |

The following are examples of electroless plating.

EXAMPLE 6

Electroless Ni-P Plating

| | |
|---|---|
| NiSO$_4$.6H$_2$O | 30 (g/l) |
| Sodium hypophosphite | 10 (g/l) |
| Sodium citrate | 10 (g/l) |
| Surfactant | 0.5 (g/l) |
| PTFE | 50 (g/l) |
| pH | 5.0 |
| Temperature | 90° C. |
| Stirring | Circulation |
| Plating time | 20 minutes |
| Thickness of plated film | 3 μm |

EXAMPLE 7

Electroless Ni-B Plating

| | |
|---|---|
| NiSO$_4$.6H$_2$O | 30 (g/l) |
| Dimethylamine borane | 10 (g/l) |
| Sodium citrate | 20 (g/l) |
| Surfactant | 0.5 (g/l) |
| PTFE | 5.0 (g/l) |
| pH | 5.5 |
| Temperature | 60° C. |
| Stirring | Circulation |
| Plating time | 15 minutes |
| Thickness of plated film | 3 μm |

The content of PTFE in the resultant plated film was approximately 40% by volume.

In addition to the above examples, electrolytic Co-P plating, electrolytic Ni-W-P plating, electrolytic Ni-Cu-P plating, and other electrolytic plating processes may be carried out with known plating baths. In a similar manner, electroless Co-P plating, electroless Ni-W-P plating, electroless Ni-Cu-P plating, and other electroless plating processes may be implemented with known plating baths.

As discussed above, the present invention provides a hydrogen storage alloy composite used for preparing a highly reliable hydrogen storage alloy electrode which can be charged rapidly and endures repeated charging and discharging operation. The present invention also provides a fluorocarbon compound-hydrogen storage alloy composite which has a sufficient water-repellent property and can efficiently absorb a hydrogen gas.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A fluorocarbon compound-hydrogen storage alloy composite comprising hydrogen storage alloy particles having a plated composite film covering at least a part of the surface of said particles, said plated composite film containing a metal and at least one particle of a fluorocarbon compound.

2. The fluorocarbon compound-hydrogen storage alloy composite in accordance with claim 1, wherein said plated composite film is selected from the group consisting of Ni, Cu, Co, Ni-P, Ni-W, Ni-W-P, Ni-B, Ni-W-B, Cu-Ni, Cu-P, Co-P, Co-B, and Co-W.

3. The fluorocarbon compound-hydrogen storage alloy composite in accordance with claim 1, wherein said fluorocarbon compound is a polyfluorocarbon.

4. The fluorocarbon compound-hydrogen storage alloy composite in accordance with claim 3, wherein said polyfluorocarbon is polytetrafluoroethylene.

5. The fluorocarbon compound-hydrogen storage alloy composite in accordance with claim 1, wherein said plated composite film is a porous film which allows diffusion of hydrogen.

6. The fluorocarbon compound-hydrogen storage alloy composite in accordance with claim 1, wherein said hydrogen storage alloy particles have a diameter of 0.01 to 2 mm and said fluorocarbon compound particles have a diameter of 0.01 to 50 μm.

7. The fluorocarbon compound-hydrogen storage alloy composite in accordance with claim 1, wherein said plated composite film has a thickness of 0.01 to 50 μm.

8. A method of manufacturing a fluorocarbon compound-hydrogen storage alloy composite which comprises electrolytically plating hydrogen storage alloy particles in a pyrophosphate bath with particles of a fluorocarbon compound dispersed therein to deposit a copper or a copper alloy film containing a particle or particles of said fluorocarbon compound on the surface of said hydrogen storage alloy particles.

* * * * *